(12) United States Patent
Cox et al.

(10) Patent No.: US 9,915,350 B2
(45) Date of Patent: Mar. 13, 2018

(54) P04TU DRIVE RING

(71) Applicant: A.E.S ENGINEERING LTD, Rotherham (GB)

(72) Inventors: Stephen Cox, Rotherham (GB); Thomas Broadbent, Rotherham (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 15/121,542

(22) PCT Filed: Mar. 9, 2015

(86) PCT No.: PCT/GB2015/000068
§ 371 (c)(1),
(2) Date: Aug. 25, 2016

(87) PCT Pub. No.: WO2015/128598
PCT Pub. Date: Sep. 3, 2015

(65) Prior Publication Data
US 2016/0363225 A1    Dec. 15, 2016

(30) Foreign Application Priority Data
Feb. 25, 2014   (GB) .................................. 1403311.2

(51) Int. Cl.
*F16J 15/34* (2006.01)
*F16J 15/36* (2006.01)

(52) U.S. Cl.
CPC ........... *F16J 15/3464* (2013.01); *F16J 15/36* (2013.01)

(58) Field of Classification Search
CPC .............................. F16J 15/34; F16J 15/3464
See application file for complete search history.

(56) References Cited

U.S. PATENT DOCUMENTS

| | | | | |
|---|---|---|---|---|
| 4,127,275 A * | 11/1978 | Champlin | ............ | B63H 23/321 277/358 |
| 4,415,167 A * | 11/1983 | Gits | ......................... | F16J 15/36 277/373 |
| 5,556,110 A * | 9/1996 | Marsi | ................... | F16J 15/3464 277/397 |
| 5,558,343 A | 9/1996 | Aparicio, Jr. | | |
| 5,725,219 A * | 3/1998 | Gilbert | ...................... | F16J 15/36 277/377 |
| 2005/0077685 A1* | 4/2005 | Roddis | ................. | F16J 15/3464 277/390 |
| 2010/0148448 A1* | 6/2010 | Pinto | ....................... | B22F 5/106 277/371 |

FOREIGN PATENT DOCUMENTS

| | | |
|---|---|---|
| DE | 10 61 145 B | 7/1959 |
| EP | 0798499 A1 | 10/1997 |
| WO | WO 2013/076445 A1 | 5/2013 |

* cited by examiner

Primary Examiner — Gilbert Y Lee
(74) Attorney, Agent, or Firm — Edwin D. Schindler

(57) ABSTRACT

A mechanical seal includes an elastomeric member, a spring biasing member, a longitudinally floating first member, a longitudinally non-floating second member, a longitudinally floating third member and a longitudinally floating seal face. The elastomeric member is in sealing engagement with the seal face and the first and second members and the spring biasing member is longitudinally pointed between the seal face and the third member. The first and second members are longitudinally restrained and rotationally coupled by male longitudinally protruding portions engaging with female portions.

10 Claims, 3 Drawing Sheets

P04TU DRIVE RING

FIELD OF INVENTION

The invention relates to a drive ring that is used in mechanical seals, which are fitted to rotating equipment in virtually all types of industries.

BACKGROUND TO INVENTION

Drive rings are components commonly used in mechanical seals to provide rotational drive between the rotating shaft and the rotary components of a mechanical seal, and are occasionally referred to as clamp rings. The drive is commonly achieved through the use of set screws which protrude from the drive ring to the shaft. The drive is passed from the drive ring to the other rotary components such as the seal faces through drive pins and sleeve components whilst the compression of o rings ensure that a fluid tight seal is maintained between the various components.

This method can be restrictive to the space that the seals that use it can fit in to due to the size of the set screws being a minimum diameter thereby requiring a minimum drive ring thickness. Alternative drive ring designs have therefore been devised, commonly in component seals, which use the drive ring as a constricting member which squeezes an elastomeric component onto the rotary shaft thereby providing drive between the rotating shaft into the drive ring. This rotation can then be passed by the elastomeric component or directly from the drive ring into other components and eventually into the rotary seal face. This method therefore provides a reduced size envelope however has the drawback that the drive ring may become detached from the correct location on the elastomeric component during installation.

One such example of a drive mechanism that ensures axial restriction is demonstrated in Roddis WO 2007/135402 and Roddis GB2391275 which overcomes this issue by having one of the pressed components diametrically larger than the other therefore allowing the two components to be axially located within one another. The drive between the two members is provided by numerous radially protruding male members which engage into a female portion in the second component. This design requires a large difference in diameter between the outer diameter of the drive ring and the shaft therefore potentially restricting its application.

Another such example is Keown WO2013076445 where the drive ring has the same diameter as the connecting component but axial restriction is still maintained through T-Profile sections. However, due to the profiles creating open portions a secondary section is required which does not have these sections removed to allow compression to be delivered around the entire circumference of the elastomeric component. This can therefore mean that the seal is too large for the cross sectional envelope and so restricting its use.

STATEMENTS OF INVENTION

A mechanical seal comprising an elastomeric member, a spring biasing means, a longitudinally floating first member, a longitudinally non-floating second member, a longitudinally floating third member and a longitudinally floating seal face; the elastomeric member being in sealing engagement with the seal face and the first and second members, and the spring biasing means being longitudinally positioned between the seal face and the third member, the first and second members being longitudinally restrained and rotationally coupled by at least one substantially male longitudinally protruding portion in one of the said first and second members positively engaging with at least one female portion in the other of said members.

The female portion in the second member is of finite extent thereby ensuring the presence of an annular surface about the circumference of the member so that there is a constant surface in contact with the elastomeric sealing member.

Preferably the drive ring is profiled in such a way that the outer diameter varies from one end to the other.

Preferably, the drive ring has a smaller diameter at the end which engages with the first member first thereby allowing the drive ring to be forced into the retainer to positively locate the two components together.

More preferably a drive ring has an angled cross sectional profile whereby the smallest outer diameter is smaller than the innermost diameter of the first member and the largest diameter is no larger than the outer diameter of the male longitudinally protruding portions of the first member thereby allowing positive location of the drive ring to the retainer but also with minimal cross sectional space being absorbed whilst allowing the two members to move relative to one another.

Preferably, the first member comprises a male longitudinally protruding portion which is of varying width as to allow it to couple with the female portion of the second member thereby restricting the extent of axial movement between the two components.

Preferably, wherein the longitudinally protruding portion of the first member and the female portion of the second member, are T-profiles; thereby providing the maximum amount of axial movement between the two components.

Preferably, wherein the first member comprises a female longitudinally protruding portion which is of varying width as to allow it to couple with the male portion of the second member; thereby restricting the extent of axial movement between the two components.

Preferably, the longitudinally protruding portion of the first member and the male portion of the second member, are T-profiles, thereby providing the maximum amount of axial movement between the two components Preferably, wherein the male and female portions are located at 12 and 6 o'clock positions respective to one another;

Preferably, wherein the female portion resides in a longitudinally protruding portion of semi circular nature, thereby allowing rotational drive between the two components.

Preferably, wherein the edges of the semi-circular protruding portion of the first member is in contact with the edges of the semi-circular protruding portion of the second member.

DETAILED DESCRIPTION

The invention will now be described, by way of example only, with reference to the accompanying drawings.

The general principle of mechanical seals in accordance with the present invention may be used not only in the case where the shaft is a rotary member and the housing is the stationary member but also the reverse situation, that is to say, in which the shaft is stationary and the housing is rotary.

Furthermore, the invention may be embodied in both rotary and stationary arrangements, cartridge and component seals with metallic components as well as non-metallic components.

Figure 1:
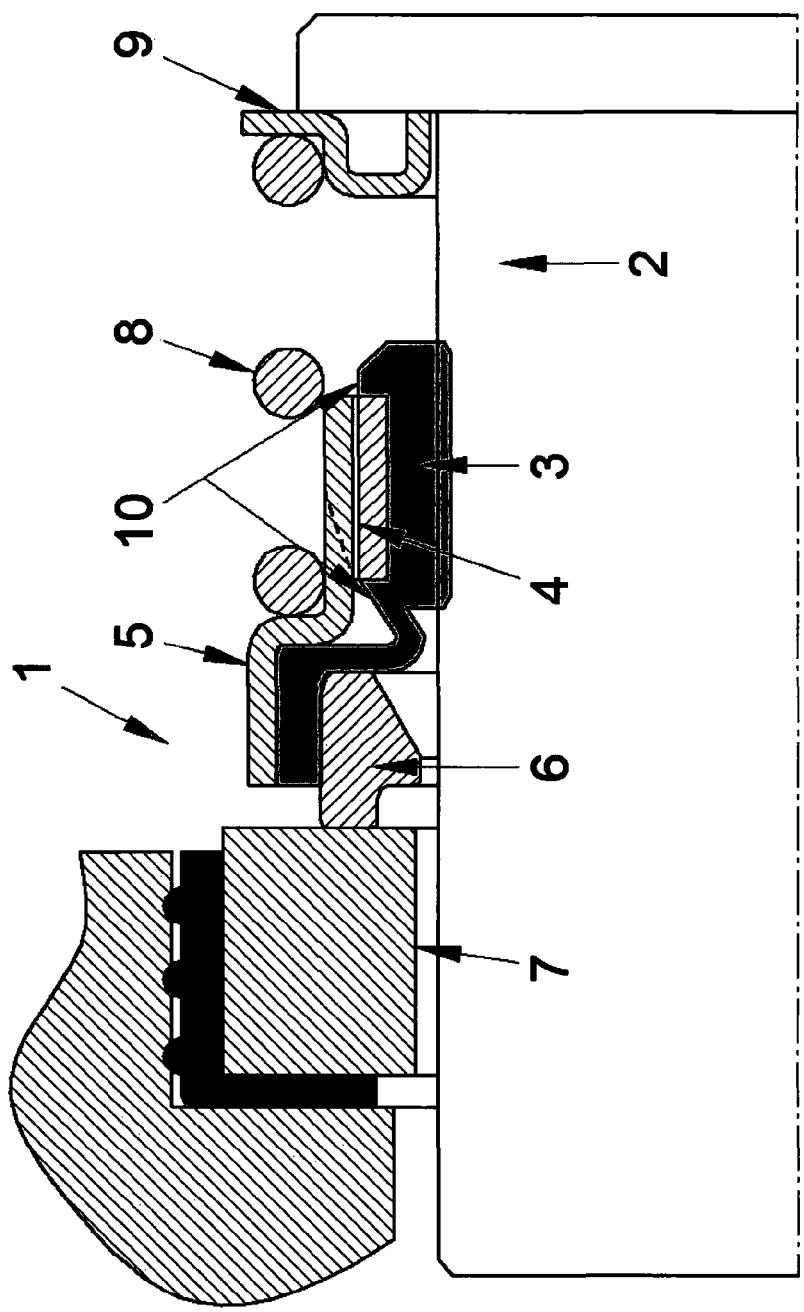
FIG. 1 shows a cross sectional profile of a rotary mechanical seal assembly.

Referring to FIG. 1, a rotary seal 1 is assembled to a shaft 2. The seal 1 is in sealing engagement with the shaft 2 through an elastomeric diaphragm member 3 which is being compressed onto the shaft 2 by a drive ring 4. The drive ring 4 is engaged with the retainer 5 which in turn compresses the diaphragm member 3 onto the seal face 6. This assembly is sometimes referred to as the rotary head. When the rotary seal 1 is coupled with a stationary seal face the only path for fluid to pass is between the seal faces (6 and 7). A spring 8 is detachably attached to the rotary head and in turn locates onto a spring plate 9 which ensures that when the seal 1 is fitted to the pump the spring 8 is compressed to the required working length thereby ensuring that there is adequate closing force between the seal faces. Nibs 10 are located on the outer diameter of the diaphragm 3 to ensure that during installation the drive ring 4 does not become detached from the diaphragm 3, however there must be adequate axial movement between the drive ring 4 and the retainer 5 to ensure that any axial movement in the shaft 2 does not cause the rotary seal face 6 to move away from the stationary seal face thereby causing it to leak.

Figure 2:
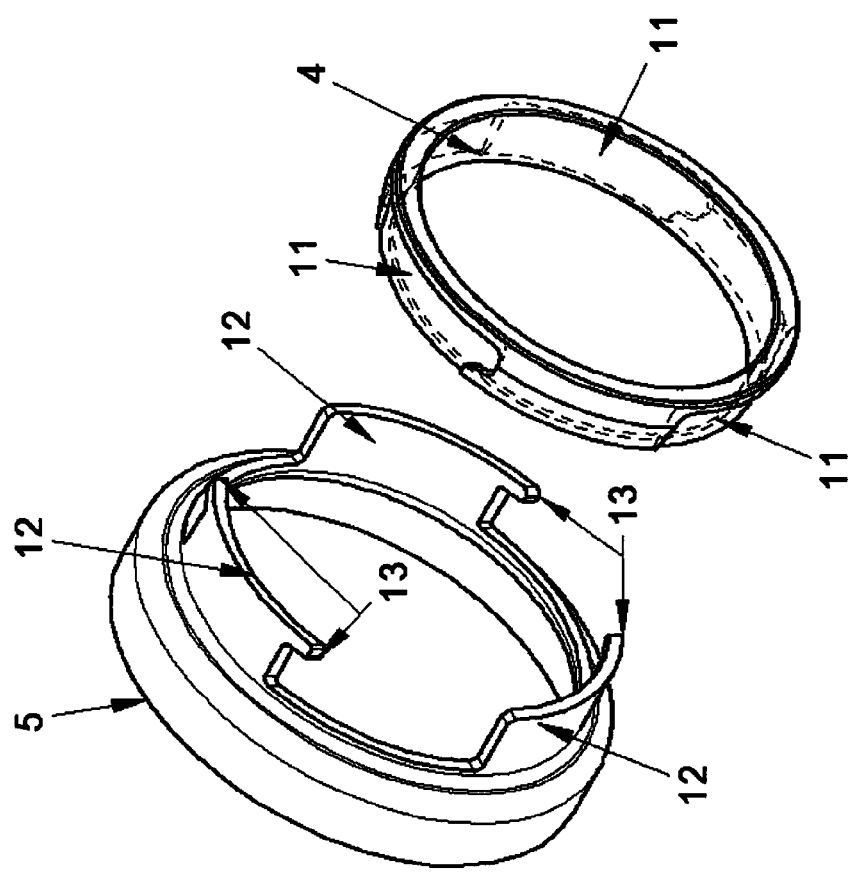
FIG. 2 shows the drive ring of the preferred embodiment of the invention in a pre assembled state to the retainer.

Referring to FIG. 2, drive ring 4 of the preferred embodiment of the invention and retainer 5 are shown in pre assembled state. It can be seen that grooves 11 in the drive ring 4 are located in opposing locations to the protruding sections 7 in the retainer 5. The protruding sections 12 have tabs 13 which create a T-profile. On the relative groove 11 the groove width increases to cater for these tabs 13. Ninety degrees to these T-profile sections are flat surfaces. This allows the drive ring 4 to directly contact the retainer 5 surface thereby allowing rotary drive to be passed between the drive ring 4 and the retainer 5.

Figure 3:
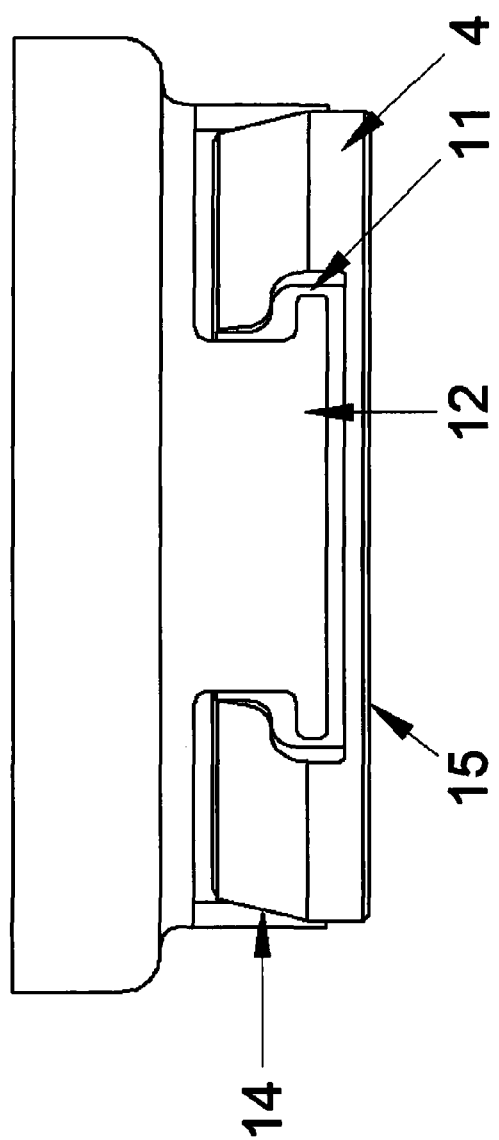
FIG. 3 shows the top view of the retainer and drive ring assembly.

In FIG. 3 it is shown that the profiles of the protruding members 12 and the grooves 11 are the same, therebeing a minor space between the grooves 11 and the male protrusions 12 to allow for tolerancing of parts and some degree of axial movement. The first intersecting portion of the drive ring 4 is angled 14 so that during installation the drive ring positively locates in the groove profile thereby restricting axial movement. It is preferable but not essential that the grooves 11 finish prior to the outermost surface 15 of the drive ring 4 thereby limiting the extent that the drive ring can pass into the retainer 5 improving fitment.

The invention claimed is:

1. A mechanical seal, comprising:
an elastomeric member;
spring biasing means;
a longitudinally floating first member comprising a retainer having a diameter with protruding sections and tabs;
a longitudinally non-floating second member comprising a drive ring having a diameter with grooves and an angled cross-sectional profile, the diameter of said drive ring being smaller than a diameter of said retainer, said drive ring engaging said longitudinally floating first member for allowing said drive ring to be forced into said retainer with the tabs of said retainer locating in the grooves of said drive ring with the angled cross-sectional profile of said drive ring pushing open a diameter of the tabs of said retainer for allowing rotary drive to be passed between said drive ring and said retainer;
a longitudinally floating third member; and,
a longitudinally floating seal face with said elastomeric member being in sealing engagement with said longitudinally floating seal face and said longitudinally floating first member and said longitudinally non-floating second member, said spring biasing means being longitudinally positioned between said longitudinally floating seal face and said longitudinally floating third member, and said longitudinally floating first member and said longitudinally non-floating second member being longitudinally restrained and rotationally coupled by a male longitudinally protruding portion in one of said longitudinally floating first member and said longitudinally non-floating second member positively engaging with a female portion in one of said longitudinally non-floating second member and said longitudinally floating first member, wherein said male longitudinally protruding portion has a varying width for facilitating coupling with said female portion of said longitudinally non-floating second member thereby having only a single profile.

2. The mechanical seal according to claim 1, wherein said longitudinally non-floating second member has an outer diameter varying from a first end to a second end.

3. The mechanical seal according to claim 2, wherein said longitudinally non-floating second member second member has a smaller diameter at the first end for engaging with said longitudinally floating first member.

4. The mechanical seal according to claim 3, wherein said longitudinally floating first member has said male longitudinally protruding portion and said longitudinally non-floating second member has said angled cross-sectional profile, wherein a smallest outer diameter is smaller than an innermost diameter of said first longitudinally floating first member and a largest diameter is no larger than the outer diameter of said male longitudinally protruding portion of said first longitudinally floating first member.

5. The mechanical seal according to claim 1, wherein said longitudinally male protruding portion of said longitudinally floating first member and said female portion of said longitudinally non-floating second member have T-profiles.

6. The mechanical seal according to claim 1, wherein said longitudinally floating first member includes said longitudinally protruding male portion of varying width for allowing it to couple with said female portion of said longitudinally non-floating second member.

7. The mechanical seal according to claim 1, wherein said longitudinally protruding male portion and a corresponding said female portion have T-profiles.

8. The mechanical seal according to claim 1, wherein said longitudinally protruding male portion and a corresponding said female portion are located 12 o'clock and 6 o'clock positive relative to one another.

9. The mechanical seal according to claim 1, wherein said female portion is located in said longitudinally protruding male portion having a semi-circular shape.

10. The mechanical seal according to claim 9, wherein said protruding male portion has an edge of the semi-circular shape of said longitudinally floating first that contacts an edge of the semi-circular shape of said longitudinally non-floating second member.

* * * * *